(12) United States Patent
Supper (10) Patent No.: US 9,655,399 B1
(45) Date of Patent: May 23, 2017

(54) EARPLUG CONNECTOR FOR MULTI-SIGNAL AND MULTI-POWER RECEIVING HELMETS

(71) Applicant: BANZAI DEFENSE GROUP, LLC, Shalimar, FL (US)

(72) Inventor: Elijah Alexander Supper, Shalimar, FL (US)

(73) Assignee: BANZAI DEFENSE GROUP, LLC, Shalimar, FL (US)

( * ) Notice: Subject to any disclaimer, the term of this patent is extended or adjusted under 35 U.S.C. 154(b) by 88 days.

(21) Appl. No.: 14/696,029

(22) Filed: Apr. 24, 2015

Related U.S. Application Data (60) Provisional application No. 62/048,192, filed on Sep. 9, 2014.

(51) Int. Cl.
*A42B 3/22* (2006.01)
*A41D 13/05* (2006.01)
(Continued)

(52) U.S. Cl.
CPC .......... *A42B 3/228* (2013.01); *A41D 13/0512* (2013.01); *A42B 3/042* (2013.01); *A42B 3/30* (2013.01); *G10K 11/178* (2013.01); *H01R 13/6691* (2013.01); *H01R 27/02* (2013.01); *H04B 3/20* (2013.01); *H04R 1/10* (2013.01); *G10K 2210/1081* (2013.01); *G10K 2210/1281* (2013.01); *H04R 2420/09* (2013.01)

(58) Field of Classification Search
CPC .... A41D 13/0512; A42B 3/228; A42B 3/042; A42B 3/30; G10K 11/178; G10K 2210/1081; G10K 2210/1281; G10K 11/175; H04R 1/10; H04R 1/008; H04R 1/1025; H04R 1/1041; H04R 1/1083; H04R 2420/09; H01R 13/6691; H01R 27/02; H01R 1/10; H04B 3/20
See application file for complete search history.

(56) References Cited

U.S. PATENT DOCUMENTS

8,750,534 B2 * 6/2014 Yamkovoy ........... H04R 1/1091
381/111
8,750,535 B2 * 6/2014 Yamkovoy ............... H04R 1/10
381/111
(Continued)

*Primary Examiner* — Sonia Gay
(74) *Attorney, Agent, or Firm* — Rao DeBoer Osterrieder, PLLC (57) ABSTRACT

An earplug connector for simultaneously providing an audio signal from a vehicle or an extra-vehicular source to a pilot while providing power to a noise reduction device while operating the vehicle. The earplug connector has a multi-pin connector for receiving audio signal and power from a pilot interface assembly connected to the vehicle. A ground, power, and audio signal connector transfers power to a noise reduction device worn by a pilot. An audio output continuously transfers audio signals from the multi-pin connector to earplugs and a multi-pin signal separator is in electrical and audio communication between the multi-pin connector and the ground, power, and audio signal connector. The audio output receives audio signals from the multi-pin connector and selectively passes the audio signals to the earplugs while transferring power to a noise reduction device while accepting a plurality of pin configurations.

12 Claims, 5 Drawing Sheets

(51) Int. Cl.
*A42B 3/30* (2006.01)
*G10K 11/178* (2006.01)
*H01R 13/66* (2006.01)
*H01R 27/02* (2006.01)
*H04B 3/20* (2006.01)
*H04R 1/10* (2006.01)
*A42B 3/04* (2006.01)

(56) References Cited

U.S. PATENT DOCUMENTS

2001/0023141 A1* 9/2001 Chang .................. G06F 1/16
 439/76.1
2012/0308030 A1* 12/2012 Yamkovoy ............... H04R 1/10
 381/74
2012/0308048 A1* 12/2012 Yamkovoy ........... H04R 1/1091
 381/111

* cited by examiner

EARPLUG CONNECTOR FOR MULTI-SIGNAL AND MULTI-POWER RECEIVING HELMETS

CROSS REFERENCE TO RELATED APPLICATION

The current application claims priority to and the benefit of U.S. Provisional Patent Application Ser. No. 62/048,192 filed on Sep. 9, 2014, entitled "CONTINUOUSLY OPERABLE EARPLUG CONNECTOR FOR MULTI-SIGNAL AND MULTI-POWER RECEIVING HELMETS". This reference is hereby incorporated in its entirety.

FIELD

The current embodiments generally relate to an earplug connector providing noise reduction, power separation and transfer of vehicle audio signals from a vehicle to a pilot.

BACKGROUND

A need exists for improving ear protection and to communicate critical audio to a pilot from a vehicle or an extravehicular source.

A further need exists to reduce audio echo effects for pilots by isolating the audio signal from a vehicle to ears of a pilot.

A need exists for an audio separator that functions between a pilot wearing a helmet and life support equipment without the need for an adapter.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The current embodiments generally relate to an earplug connector providing noise reduction, power separation and transfer of vehicle audio signals from a vehicle to a pilot.

A benefit of the invention is that the earplug connector can be selectively switchable to provide power and stop power to noise reducing devices usable within a multi-signal and multi-power receiving helmet.

A benefit of the invention is that the earplug connector can integrate specialized electronics into custom molded ear pieces allowing a pilot or air crew to receive clear audio signals while simultaneously protecting the pilot's or air crew's ears from damaging ambient noises.

A benefit of the invention is that the earplug connector can prevent accidents by delivering clear air traffic control communications to pilots and/or air crew even during extremely loud noises generated by a vehicle malfunction.

A benefit of the invention is that the earplug connector can prevent injuries onboard the vehicle that can occur when the air crew fails to hear commands from a pilot, such as to strap in during a steep descent or a roll to avoid an obstacle.

A benefit of the invention is that the earplug connector can enable a pilot to more efficiently multitask and process information while operating a complex and high-speed vehicle.

The term "aircraft" as used herein can refer to a commercial jet aircraft, non-commercial jet aircraft, non-jet aircraft, aircraft trainers, helicopters, space shuttles, simulators, rockets for connecting to a space station or exploring space, and combinations thereof.

The term "audio signal" can refer to air traffic control communication, airborne asset communication, ground based asset communication that can be communicating with aircraft, air crew member communication, one or more aircraft originating communications, aircraft system advisories, aircraft system warnings, aircraft malfunction alerts, and combinations thereof.

The term "a multi-pin connector" as used herein can refer to a connector with multiple pins that can be configured to simultaneously transfer power and an audio signal.

The term "multi-pin signal separator" as used herein can refer to a housing made of a shock resistant material, such as plastic, natural rubber or synthetic rubber, water resistant material, metal coated with rubber, electro-magnetically shielded material, and combinations thereof, which enables the transmission of clear audio signals.

The term "multi-signal, multi-power receiving helmet" as used herein can refer to a helmet or head protection apparatus worn by a pilot, copilot, boat operator, race car driver, or any person that can require audio information, video information, flight information, and power from both the vehicle and an extra-vehicular source, such as an outside agency or control tower.

The term "noise reduction device" as used herein can refer to a means of receiving (either passively or actively) electrical power and generating an audio signal that is opposite in phase of the ambient noise and/or the directed audio transmissions being received.

The term "pilot interface communication connector" as used herein can refer to a connector configured to provide both power and audio signals from the vehicle to the pilot.

The term "pilot interface connector" as used herein can refer to a connector that provides the transfer of various components from the vehicle to the pilot of the vehicle.

The term "vehicle" as used herein can refer to commercial vehicles, non-commercial vehicles, vehicle trainers or simulators, aircraft, a boat, a car, a motorcycle, a submarine, a space craft, deep ocean exploration vehicles, similar vehicles, or combinations thereof.

The earplug connector can simultaneously provide audio signals originating from at least one of: a vehicle and an extra-vehicular source; and provide power to a noise reduction device contained in an ear protection device worn under a multi-signal, multi-power receiving helmet for use while operating the vehicle.

The earplug connector can have a multi-pin connector connecting to an audio signal and power cable, which can receive audio signals and power from a pilot interface communication connector of a pilot interface multifunction connector that can engage a pilot interface assembly connected to a vehicle.

In embodiments, the multi-pin connector can be configured to accept a plurality of different audio signals and power cables with differing pin configurations without requiring any additional adapter.

The earplug connector can have a ground, power, and audio signal connector in communication with the multi-pin connector for transferring power to a noise reduction device in an ear protection device.

In embodiments, the ground, power, and audio signal connector can be configured to accept a plurality of different power cords for different noise protection devices having differing pin configurations without requiring any additional adapter.

The earplug connector can have an audio output for continuously transferring audio signals from the multi-pin connector to earplugs, an ear protection device, and combinations thereof.

The earplug connector can have a multi-pin signal separator in electrical and audio communication between the multi-pin connector, the ground, power, and audio signal connector, and the audio output.

In embodiments, the multi-pin signal separator can be configured for receiving all or a portion of the audio signal from at least one of: the multi-pin connector and the ground, power, audio signal connector and selectively passing all or a portion of the audio signal to earplugs while simultaneously transferring power to the noise reduction device.

Figure 1:
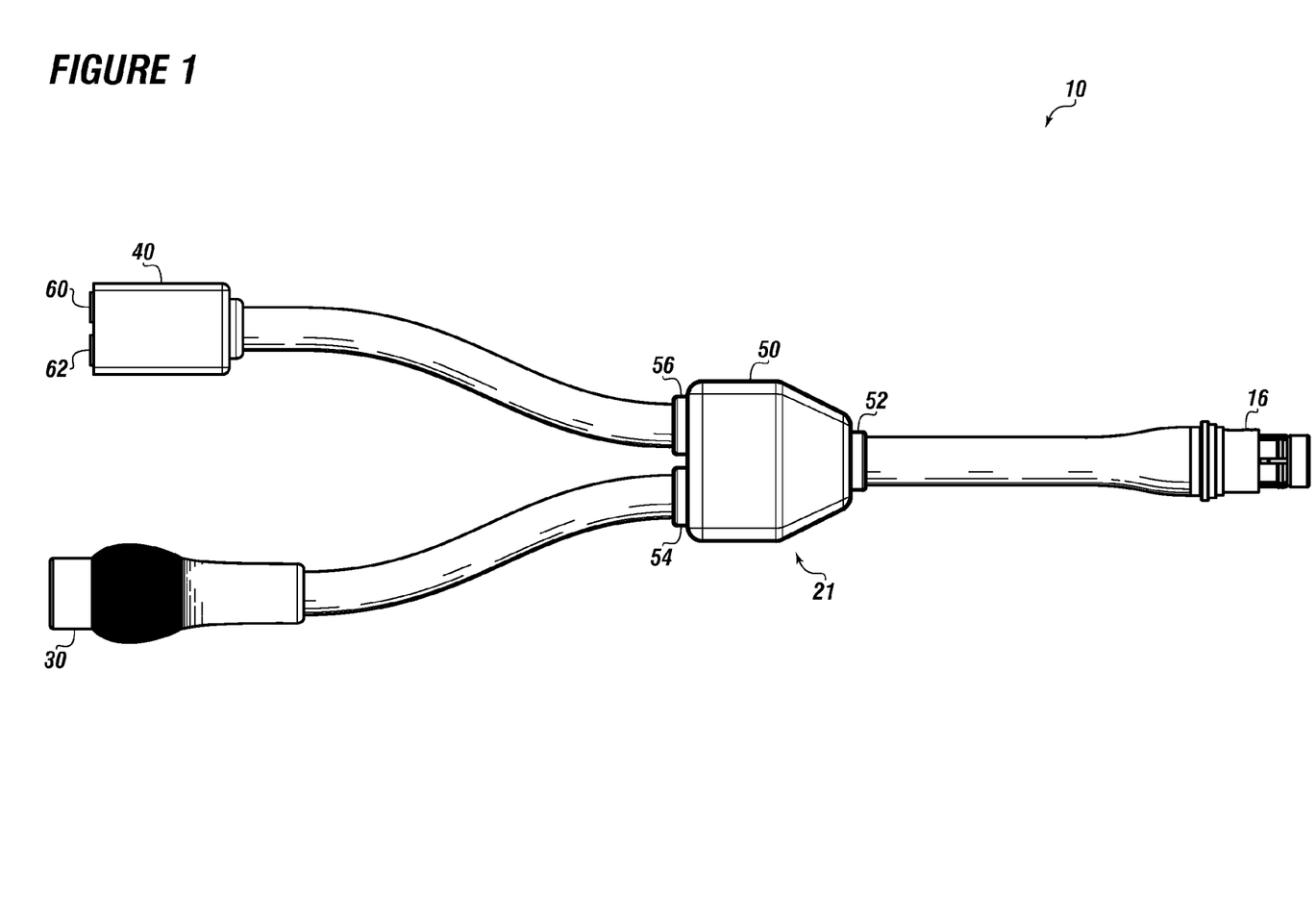
FIG. 1 depicts a top view of the earplug connector according to one or more embodiments.

Turning now to the Figures, FIG. 1 depicts a top view of the earplug connector according to one or more embodiments.

The earplug connector 10 can simultaneously provide audio signals from at least one of: a vehicle and an extra-vehicular source, while providing power from the vehicle to electrically operate a noise reduction device contained in an ear protection device worn under a multi-signal, multi-power receiving helmet for use while operating the vehicle.

In embodiments, the earplug connector can be used with the helmets of jet aircraft that require a pilot multifunction interface connector which can also connect to an oxygen supply and other devices commonly used at high altitude or while flying under high gravitational force conditions.

The earplug connector 10 can have a multi-pin connector 16 for connecting to a pilot interface communication connector. The pilot interface communication connector can engage a pilot interface connector that can additionally engage a pilot interface assembly of the vehicle.

The multi-pin connector 16 can be configured to simultaneously and selectively transfer power from the pilot interface assembly to a noise reduction device contained in an ear protection device worn by the pilot.

In embodiments, the multi-pin connector 16 can have but is not limited to, from 2 pin to 14 pins, which can be configured to simultaneously transfer power and audio signal. In further embodiments, the multi-pin connector 16 can have overmolding on the outside of the connector to provide a waterproof connection and shielding for the wires running through the multi-pin connector 16. Examples of usable multi-pin connectors 16 can be from 0.5 millimeters to 0.8 millimeters in length, ranging from 4.0 amps to 4.4 amps. In further embodiments, the multi-pin connector 16 can have a voltage less than or equal to 250 volts (DC).

The earplug connector 10 can have a multi-pin signal separator 21 for receiving both power and audio signals from the multi-pin connector 16. In embodiments, the multi-pin signal separator 21 can be from 0.5 of an inch to 6 inches in width, 0.5 of an inch to 6 inches in length, and ¹⁄₁₆ of an inch to 2 inches in thickness.

The multi-pin signal separator 21 can be contained in a housing 50. In embodiments, the housing 50 can be a plastic or a rubberized material. In further embodiments, the housing 50 can be manufactured to civil and military standards for flight, which can include water resistance, electrical and magnetic interference protection, and impact resistance.

The multi-pin signal separator 21 can be configured to isolate all audio signals from the power being transferred from the multi-pin connector 16 or isolate some of the audio signals from the power being transferred from the multi-pin connector 16.

The multi-pin signal separator 21 can have an audio in port 52 for receiving power and audio signals from the multi-pin connector 16.

The multi-pin signal separator 21 can have a ground power audio port 54 for transferring power and audio signals from the multi-pin connector 16 to a ground, power, and audio signal connector 30.

The multi-pin signal separator 21 can have an audio out port 56 for transferring an audio signal to an audio output 40.

The audio output 40 can transfer audio signals to earplugs. In embodiments, the earplugs can be custom earplugs that can be worn beneath an ear protection device while simultaneously wearing the multi-signal, multi-power helmet.

In embodiments, the audio output 40 can have a plurality of audio outlets for delivering audio signals.

In embodiments, the audio output 40 can provide a first audio outlet 60 and a second audio outlet 62. In further embodiments, multiple audio outlets can be used.

In embodiments, the audio output 40 can convey at least one of: a mono sound, a stereo sound, or a 3D sound to the earplugs. In further embodiments, the audio output 40 can have only one outlet to provide a mono sound, a stereo sound, or a 3D sound to the earplugs and the ear protection device.

The ground, power, and audio signal connector 30 can prevent any audio signal from entering the multi-signal, multi-power receiving helmet.

In embodiments, the earplug connector 10 can be used with a plurality of different pilot interface communication connectors, ear protection device cords, and earplug cords, wherein each cable or cord can have different pin configurations without requiring any adaptors.

Figure 2:
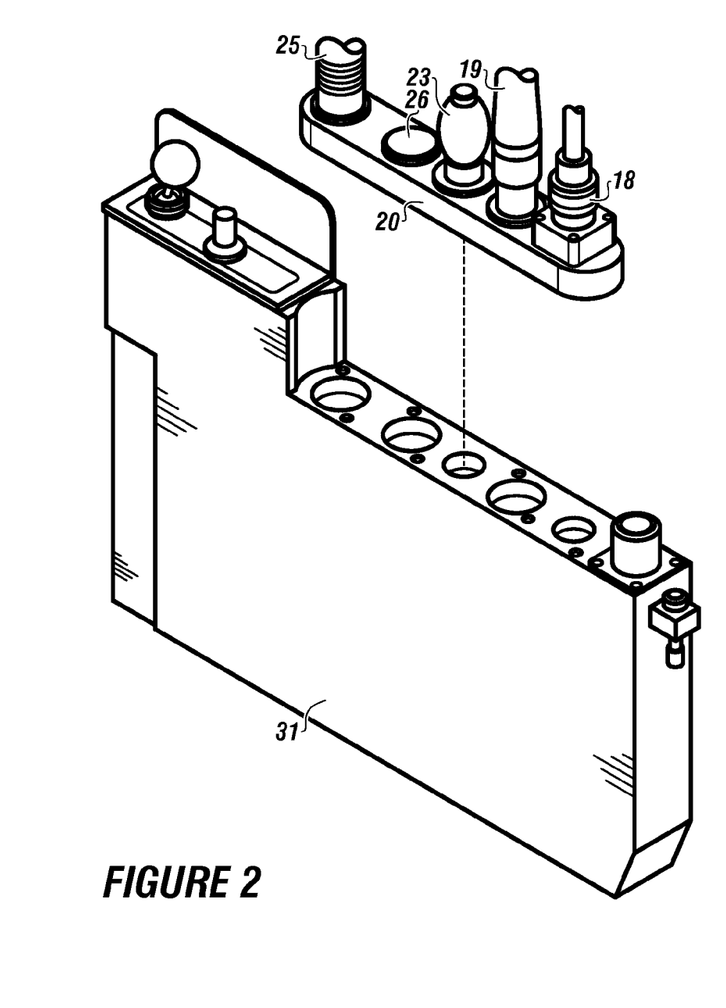
FIG. 2 depicts an isometric view of a pilot interface assembly engaging a pilot interface multifunction connector according to one or more embodiments.

FIG. 2 depicts an isometric view of a pilot interface assembly engaging a pilot interface multifunction connector according to one or more embodiments.

The pilot interface multifunction connector 20 is depicted with the pilot interface communication connector 18 as well as an anti-g suit connector 19, an oxygen hose connector 25, an expansion port 26, and a pilot locking mechanism 23.

In embodiments, the power carried by the pilot interface communication connector 18 can be a 28 volt DC current. In further embodiments, voltages can be used from 1.5 to 4 volts. In even more embodiments, 9 volts can be passed by the pilot interface communication connector 18.

The pilot interface communication connector 18 of the pilot interface multifunction connector 20 can engage a pilot interface assembly 31.

Figure 3:
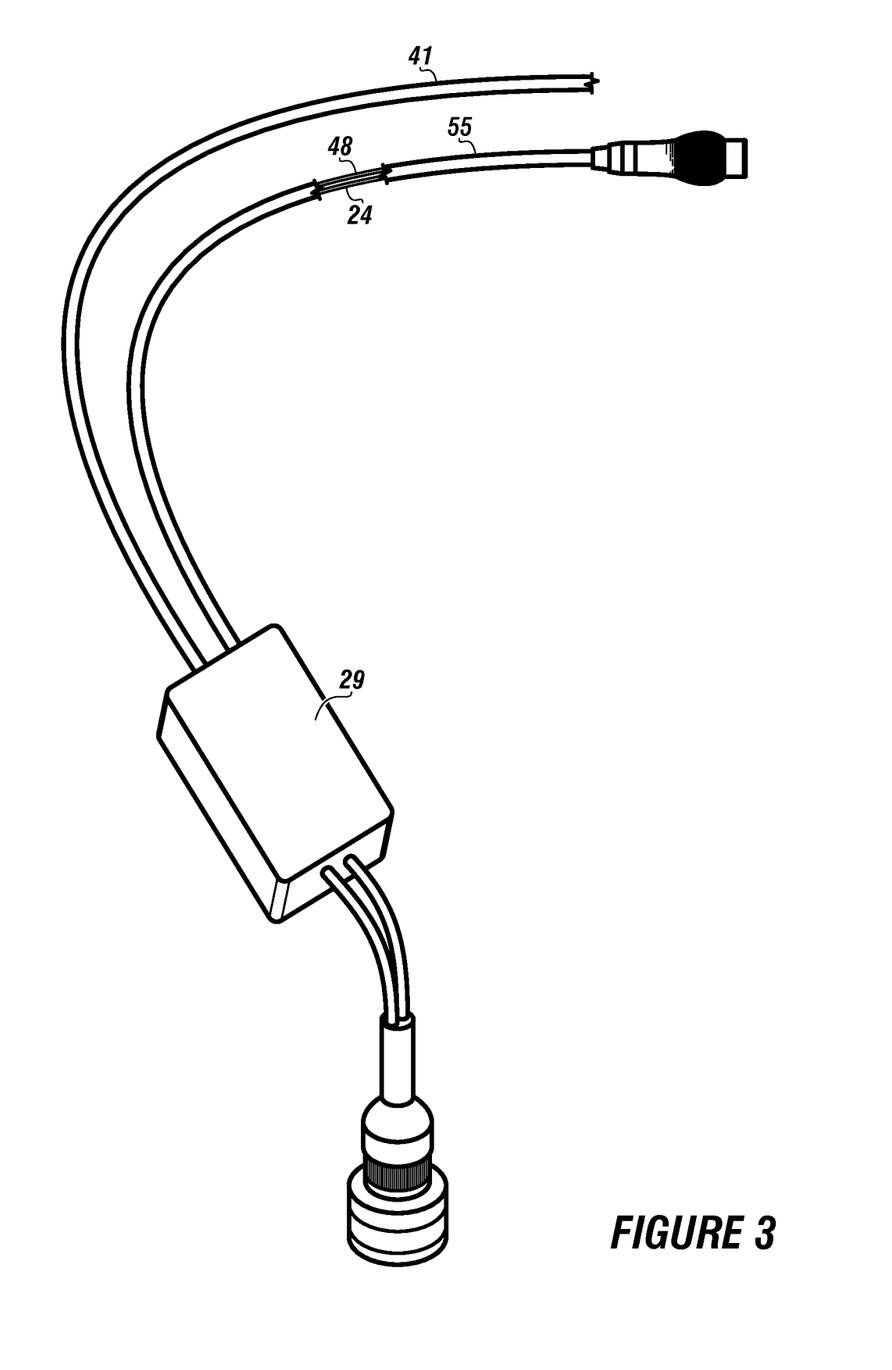
FIG. 3 depicts a partial cut away view of power and audio signals in an audio signal and power cable according to one or more embodiments.

FIG. 3 depicts a partial cut away view of power and audio signals in an audio signal and power cable according to one or more embodiments.

An audio input signal cable 41 can transmit pilot signals such as voice commands, from an audio input device for the pilot, in which signals can then be transferred through the pilot interface communication connector to the pilot interface assembly ultimately to a vehicle, to an extra-vehicular source, or both. In embodiments, the vehicle can communicate with the extra-vehicular source, such as a control tower.

The audio signal and power cable 55 can engage the pilot interface communication connector. A power 48 and audio signal 24 can be contained by the audio signal and power cable 55.

A switch 29 can be toggled to transfer the power 48 to a noise reduction device when the switch 29 is toggled to an "on" position. The switch 29 can be turned off when the switch 29 is toggled to an "off" position. In embodiments, the switch 29 can be a depressible button or a voice activated switch. In further embodiments, the switch 29 can be a "switchable feature".

Figure 4:
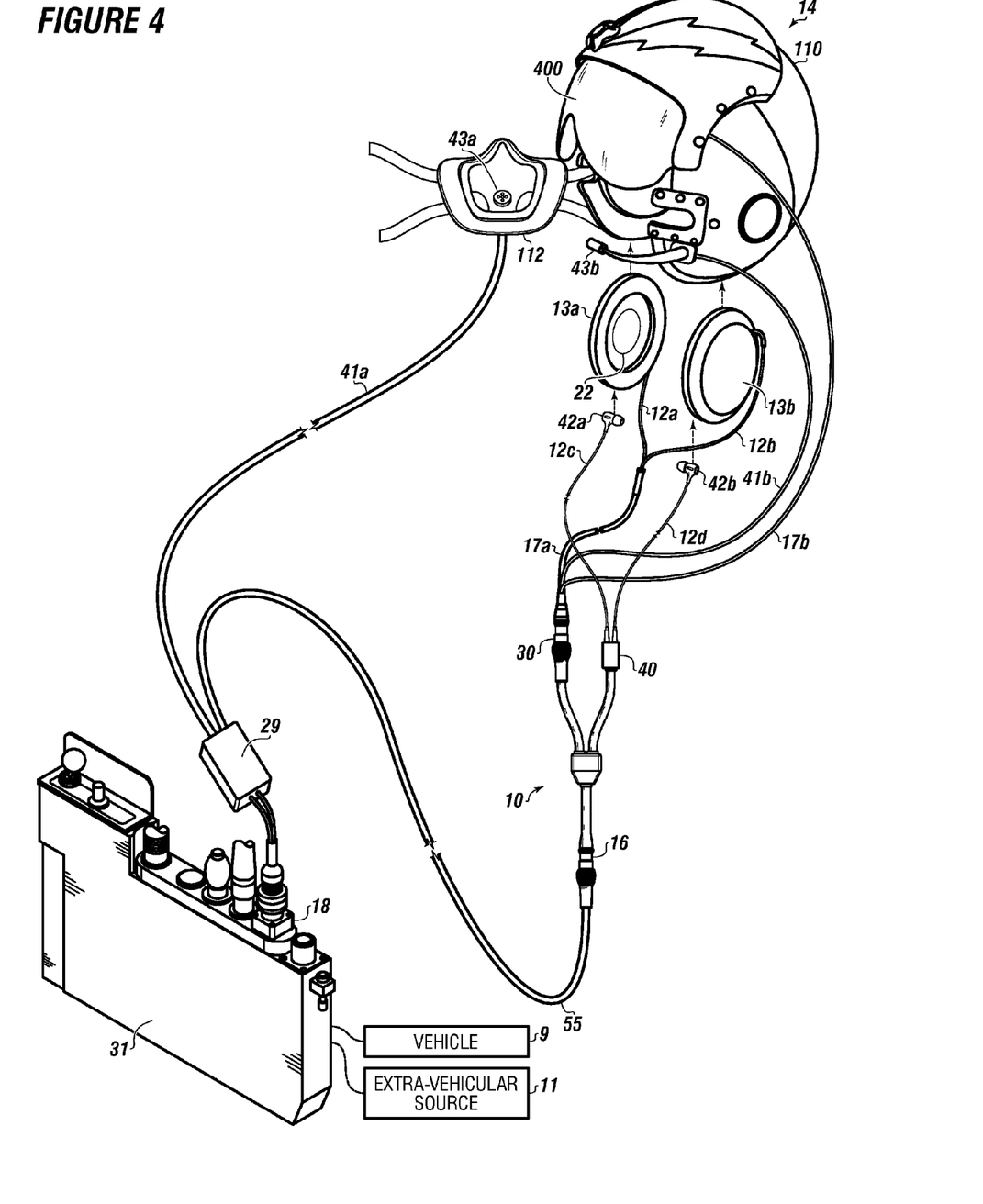
FIG. 4 depicts the earplug connector with a multi-signal, multi-power receiving helmet connected to a vehicle according to one or more embodiments.

FIG. 4 depicts the earplug connector with a multi-signal, multi-power receiving helmet connected to a vehicle according to one or more embodiments.

The earplug connector 10 can be connected to a multi-signal, multi-power receiving helmet 14 and the pilot interface assembly 31 that can further communicate with the vehicle 9 and an extra-vehicular source 11.

A pilot wearing the multi-signal, multi-power receiving helmet 14 can have ear protection devices 13a and 13b. Each ear protection device 13a and 13b can contain a noise reduction device 22.

The multi-signal, multi-power receiving helmet 14 can be formed by a hard shell head covering 110.

The ear protection devices 13a and 13b can connect with audio and power cords 12a and 12b which can each engage the ground, power, and audio signal connector 30 of the earplug connector 10.

Earplugs 42a and 42b can connect to the audio output 40 of the earplug connector 10 with audio and power cords 12c and 12d.

A first power and audio cord 17a can provide power and audio to the ear protection devices 13a and 13b. A second power and audio cord 17b can provide power to a night vision device 400 mounted to the multi-signal, multi-power receiving helmet 14 and audio signals to speakers installed in the multi-signal, multi-power receiving helmet 14.

The multi-signal, multi-power receiving helmet 14 can support at least one night vision device 400 connecting to the ground, power, and audio signal connector 30.

The night vision device 400 can be at least one of: a night vision goggle, a lip light, and a night vision monocular.

In embodiments, the first power and audio cord 17a and the second power and audio cord 17b can be used to provide power to a recording device mounted to the multi-signal, multi-power receiving helmet 14.

A first audio input device 43a can be a microphone in a mask 112. The first audio input device 43a can connect to a first audio input signal cable 41a through the switch 29 to the pilot interface communication connector 18. In embodiments, the switch 29 is not required.

A second audio input device 43b can be a microphone attached to the multi-signal, multi-power receiving helmet 14 but not contained in the mask 112. The second audio input device 43b can connect to a second audio input cable 41b through the switch 29 to the pilot interface communication connector 18. In embodiments, the second audio input device 43b can be a boom microphone.

The first audio input device 43a or the second audio input device 43b can provide audio to the pilot interface communication connector 18 which can transfer spoken words to the vehicle 9 and/or to the extravehicular source 11.

The power transferred by the earplug connector 10 can be a voltage appropriate for powering the night vision device 400.

The multi-pin connector 16 of the earplug connector 10 can be connected to the audio signal and power cable 55 that can further engage the pilot interface communication connector 18.

In embodiments, the earplug connector 10 can be used with a plurality of different pilot interface communication connectors and different audio and power cords, each having different pin configurations without requiring any adaptors.

In embodiments, the multi-pin connector 16 can additionally be configured to act as a ground between the multi-signal, multi-power receiving helmet 14 and the vehicle 9 to prevent electrical shock between the pilot and the vehicle 9 and to prevent ground voltage loops.

The earplug connector 10 can receive and separate audio signals which can include at least one of: an air traffic control communication; communication from or to another airborne asset; communication from or to a ground based asset: in vehicle communication from air crew members; and a vehicle originating communication further including at least one of: a vehicle system advisory; a vehicle system warning; and a vehicle malfunction alert which can transmit the alert from an audio control system of a vehicle.

In embodiments, the vehicle 9 can be an aircraft, automobile, a boat, a truck, a rotor craft, an underwater vessel, a remotely operated vehicle, a locomotive, a space transport vehicle, a space exploration vehicle or combinations thereof.

Figure 5:
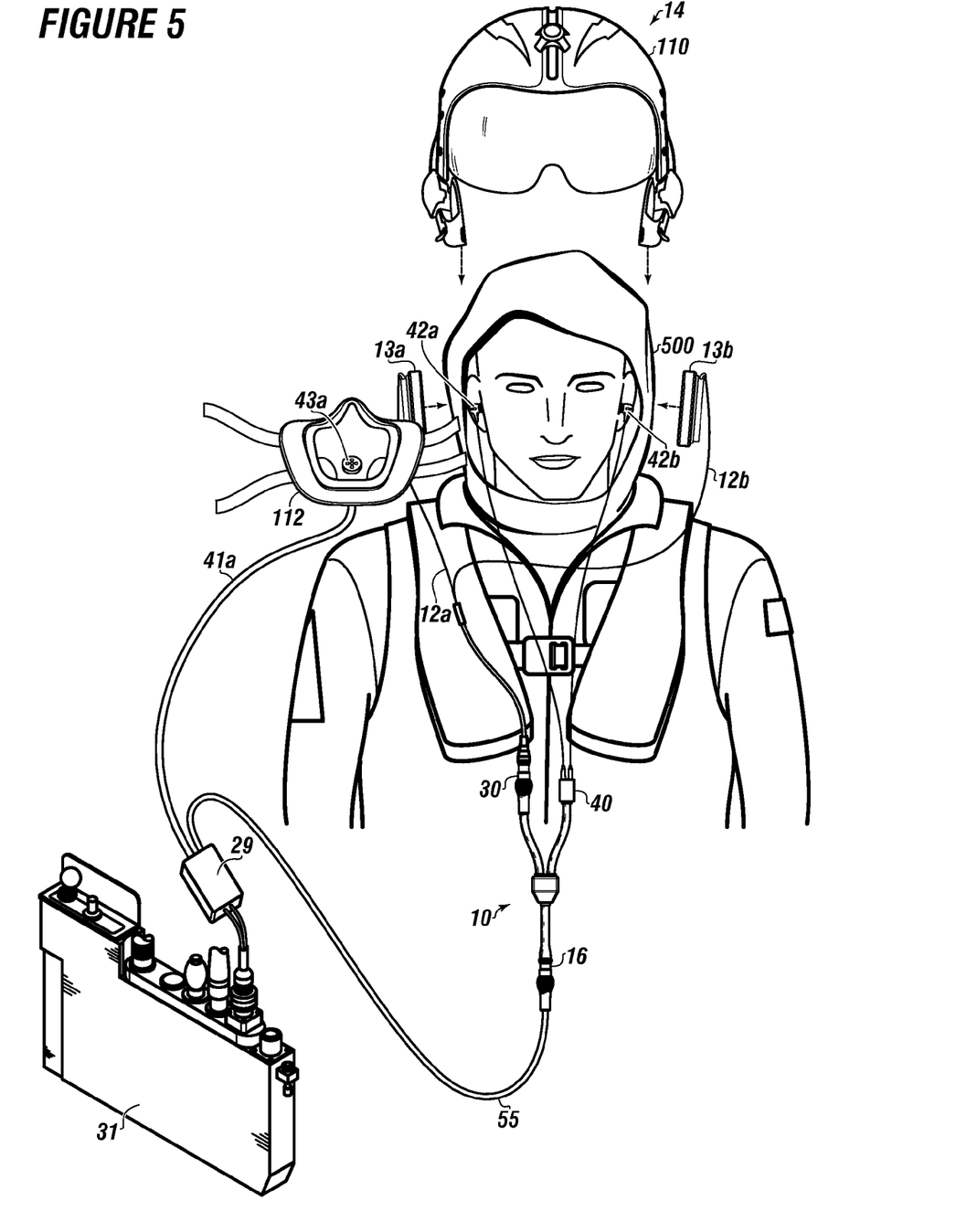
FIG. 5 shows the earplug connector with a protective flexible fabric garment and multi-signal and multi-signal, multi-power receiving helmet according to one or more embodiments.

FIG. 5 depicts the earplug connector with a protective flexible fabric garment and multi-signal, multi-power receiving helmet according to one or more embodiments.

The multi-signal, multi-power receiving helmet 14 with the hard shell head covering 110 is depicted in the progress of be installed over a protective flexible fabric garment 500.

In embodiments, the protective flexible fabric garment 500 can be configured to cover simultaneously, the shoulders, neck, and a portion of the head of a pilot beneath the multi-signal, multi-power receiving helmet 14.

In embodiments, the mask can be mounted to the protective flexible fabric garment 500.

The protective flexible fabric garment 500 can be commonly referred to as a "hoody".

The protective flexible fabric garment 500 can be at least one of: a fire resistant fabric; a fabric resistant to chemical exposure; a fabric that aids in protecting a pilot from nuclear fallout; and a fabric resistant to biological agents.

The earplug connector 10 is depicted with the multi-pin connector 16, the ground, power, and audio signal connector 30, and the audio output 40.

Earplugs 42a and 42b can be used in a pilot's ears under the protective flexible fabric garment 500. The earplugs 42a and 42b can connect to the audio output 40.

Ear protection devices 13a and 13b can cover the earplugs 42a and 42b respectively.

The audio and power cords 12a and 12b can connect to the ground, power, and audio signal connector 30.

The protective flexible fabric garment 500 can be attached to the mask 112. In embodiments, the mask 112 can be a respirator.

The mask 112 can contain the first audio input device 43a which can engage the first audio input signal cable 41a to transmit pilot messages to a pilot interface communication connector that can engage the pilot interface assembly 31.

The multi-pin connector 16 can provide a connection to communicate audio signals and power through the audio signal and power cable 55. The audio signal and power cable 55 can receive an audio signal and power from the pilot interface communication connector of the pilot interface multifunction connector that can engage a pilot interface assembly 31 connected to the vehicle.

The multi-pin connector 16 is depicted to accept a plurality of different audio signal and power cables with differing pin configurations without requiring any additional adapter.

The switch 29 is also depicted.

While these embodiments have been described with emphasis on the embodiments, it should be understood that within the scope of the appended claims, the embodiments might be practiced other than as specifically described herein.

What is claimed is:

1. An earplug connector for simultaneously providing an audio signal originating from at least one of: a vehicle and an extra-vehicular source and providing power to a noise reduction device contained in an ear protection device for use while operating the vehicle, the earplug connector comprising:
   a) a multi-pin connector for connecting to an audio signal and power cable receiving the audio signal and the power from a pilot interface communication connector of a pilot interface multifunction connector that engages a pilot interface assembly connected to the vehicle, the multi-pin connector configured to accept a plurality of different audio signal and power cables with differing pin configurations without requiring any additional adapter
   b) a ground, power, and audio signal connector in communication with the multi-pin connector for transferring the power received by the multi-pin connector to the noise reduction device in the ear protection device of a pilot, and receiving an audio signal from an audio input device, the ground, power, and audio signal connector configured to accept a plurality of different power cords for different noise protection devices having differing pin configurations without requiring any additional adapter;
   c) an audio output for continuously transferring the audio signal from the multi-pin connector to at least one of: earplugs and the ear protection device, the audio output configured to accept a plurality of different audio cords with differing pin configurations without requiring any additional adaptor, and
   d) a multi-pin signal separator in electrical and audio communication between the multi-pin connector, the ground, power, and audio signal connector and the audio output, the multi-pin signal separator for receiving all or a portion of the audio signal from at least one of: the multi-pin connector and the ground, power, audio signal connector and selectively passing all or the portion of the audio signal to earplugs while simultaneously transferring the power to the noise reduction device.

2. The earplug connector of claim 1, wherein the multi-pin connector additionally is configured to act as a ground between a multi-signal, multi-power receiving helmet and the vehicle to prevent electrical shock between the pilot and the vehicle and to prevent ground voltage loops.

3. The earplug connector of claim 1, wherein the pilot interface multifunction connector comprises: an oxygen hose connector, an anti-g suit connector, an expansion port, and a pilot locking mechanism.

4. The earplug connector of claim 1, wherein the audio signal includes at least one of:
   a) air traffic control communication;
   b) communication from or to another airborne asset;
   c) communication from or to a ground based asset;
   d) in vehicle communication from air crew members; and
   e) a vehicle originating communication including at least one of:
      (i) a vehicle system advisory;
      (ii) a vehicle system warning; and
      (iii) a vehicle malfunction alert which transmits from an audio control system of the vehicle.

5. The earplug connector of claim 1, wherein the multi-pin signal separator comprises:
   a) a housing;
   b) an audio in port for receiving power and audio signals from the multi-pin connector,
   c) a ground power audio port for transferring power and audio signals to the ground, power, and audio signal connector; and
   d) an audio out port for transferring audio signals to the audio output.

6. The earplug connector of claim 1, wherein the audio output comprises a plurality of audio outlets for delivering audio signals.

7. The earplug connector of claim 6, wherein the audio output conveys at least one of: a mono sound, a stereo sound, and a 3D sound to at least one of: the earplugs and the ear protection device.

8. The earplug connector of claim 1, wherein the pilot interface communication connector engages an audio input signal cable for transmitting audio signals to at least one of: the vehicle and the extravehicular source.

9. The earplug connector of claim 1, comprising a switch for allowing power to be transferred to the noise reduction device when the power is turned on.

10. The earplug connector of claim 1, further comprising at least one night vision device connecting to the ground, power, and audio signal connector, wherein the at least one night vision device receives the power from the ground, power, and audio signal connector, and further wherein the at least one night vision device comprising at least one of: a night vision goggle, a lip light, and a night vision monocular.

11. The earplug connector of claim 1, wherein the audio signal includes a signal from at least one audio input device.

12. The earplug connector of claim 1, wherein the vehicle is an aircraft, an automobile, a boat, a truck, a rotor craft, an underwater vessel, a space craft, a remotely operated vehicle, or a locomotive.

* * * * *